(12) United States Patent
Raksha et al.

(10) Patent No.: US 8,137,762 B2
(45) Date of Patent: Mar. 20, 2012

(54) TWO-AXIAL ALIGNMENT OF MAGNETIC PLATELETS

(76) Inventors: Vladimir P. Raksha, Santa Rosa, CA (US); Paul G. Coombs, Santa Rosa, CA (US); Charles T. Markantes, Santa Rosa, CA (US); Wilfred C. Kittler, Jr., Rohnert Park, CA (US); Dave Williams, Rohnert Park, CA (US); John D. Sonderman, Santa Rosa, CA (US); Cornelis Jan Delst, Fairfax, CA (US)

( * ) Notice: Subject to any disclaimer, the term of this patent is extended or adjusted under 35 U.S.C. 154(b) by 407 days.

(21) Appl. No.: 12/542,637

(22) Filed: Aug. 17, 2009

(65) Prior Publication Data

US 2010/0040799 A1    Feb. 18, 2010

Related U.S. Application Data

(60) Provisional application No. 61/089,702, filed on Aug. 18, 2008.

(51) Int. Cl.
*B05D 3/06* (2006.01)

(52) U.S. Cl. ......................................... 427/550; 427/547

(58) Field of Classification Search .................. 427/128, 427/129, 130, 131, 132, 550, 547, 393.3, 427/372.2
See application file for complete search history.

(56) References Cited

U.S. PATENT DOCUMENTS

| | | | |
|---|---|---|---|
| 2,418,479 A | 4/1947 | Pratt et al. | 427/550 |
| 4,678,682 A * | 7/1987 | Asai et al. | 427/549 |
| 4,859,495 A | 8/1989 | Peng | 427/548 |
| 5,630,877 A | 5/1997 | Kashiwagi et al. | 118/623 |
| 6,379,804 B1 | 4/2002 | Ackerman et al. | 428/433 |
| 7,258,900 B2 | 8/2007 | Raksha et al. | 427/548 |
| 2003/0034869 A1* | 2/2003 | Matsumura et al. | 336/218 |
| 2004/0009309 A1 | 1/2004 | Raksha et al. | 427/598 |
| 2004/0051297 A1 | 3/2004 | Raksha et al. | 283/57 |
| 2004/0052976 A1 | 3/2004 | Buczek et al. | 427/598 |
| 2007/0172261 A1 | 7/2007 | Raksha et al. | 399/266 |

FOREIGN PATENT DOCUMENTS

EP    1810756    7/2007

* cited by examiner

*Primary Examiner* — Timothy Meeks
*Assistant Examiner* — Tabassom Tadayyon Eslami
(74) *Attorney, Agent, or Firm* — Matthew A. Pequignot; Pequignot + Myers LLC

(57) ABSTRACT

A method of planarizing a plurality of orientable non-spherical flakes supported by a longitudinal web is disclosed. A web supporting a coating of field orientable non-spherical flakes is placed between magnets so that the fields from the magnets traverse the web. First and third magnets are provided on one side of a feedpath and a second magnet is provided between the first and third magnets on the other side of the feedpath. The first and third magnets have a same polarity and the second magnet has a complementary polarity to the first and third magnets, so that a first magnetic field spanning the feedpath is present between the first and second magnets and second magnetic field spanning the feedpath is present between the second and third magnets, wherein the magnets are positioned so that a plurality of non-spherical field orientable flakes moving along the feedpath experience a first rotation as they pass the second magnet during relative movement between the web and the magnets; The web is then moved through the fields passing the magnets and the coating is subsequently cured.

14 Claims, 6 Drawing Sheets

TWO-AXIAL ALIGNMENT OF MAGNETIC PLATELETS

CROSS-REFERENCE TO RELATED APPLICATIONS

The present invention claims priority from U.S. Provisional Patent Application No. 61/089,702 filed Aug. 18, 2008, which is incorporated herein by reference.

BACKGROUND OF THE INVENTION

Pigment particles dispersed in ink vehicle and printed on a surface of a substrate may have either high or low reflectance of incident light. This reflectance depends on several different factors. Inherent optical properties of the pigment particles significantly affect the reflectivity. Highly reflective "metallic" pigments are flake-shaped particles consisting primarily of either aluminum or other highly reflective metal. The metallic "effect" is achieved through the interaction of different individual characteristics, consisting primarily of particles size and shape as well as leafing or non-leafing behavior of the pigment.

Leafing and non-leafing properties are characteristics of the pigment determined by the pigment particles' ability to "float". Leafing pigments float on a surface of printing ink film as a result of high interfacial tension. They form a coherent surface film whose reflective properties depend on the particles fineness. Non-leafing pigments are fully wetted by the binder and are distributed uniformly throughout the coating thickness. Leafing is described in Industrial Inorganic Pigments authored by G. Buxbaum; Wiley-VCH, ISBN 3-527-28878-3, 1998, p. 229. Since leafing and non-leafing pigments behave differently, they provide a very different appearance. For example, particles of leafing aluminum pigments will distribute themselves more evenly across the surface of the film, they will provide a chrome-like finish.

A common method manufacturing "leafing" pigment particles is by ball milling of the pigment in the presence of various lubricants as is described in U.S. Pat. No. 6,379,804 in the names of Ackerman et al. Stearic acid is usually used for this purpose. The acid repels a liquid ink or paint vehicle from the surface of pigment pushing particles in the direction of interface between air and the ink surface. As a result, the platelets float to the surface of the print exhibiting a mirror-like appearance. However, a disadvantage of this method is a reduced abrasive resistance: the prints containing such "leafing" particles have poor resistance to its abrasion because the acid prevents adhesion of the ink vehicle to the surface of the flake.

Images printed with non-leafing particles, in contrast to the "leafing" pigment do not have a smooth mirror-like appearance. Instead, they have a speckling "sparkle-like" finish. On the other hand, these printed images have very good abrasive resistance because an ink vehicle forms a strong bond with a non-modified surface of pigment particles. It would be advantageous to fabricate a highly reflective image printed with non-leafing pigment particles distributed in the layer of ink parallel to the surface of the ink similar to leafing particles.

It is possible to orient particles in the layer of ink by an external action. For instance, U.S. Pat. No. 2,418,479 in the name of Pratt et al., references fabrication of bright metal paint films by brushing or knifing.

Pratt in U.S. Pat. No. 2,418,479 also discloses a method of making particles with leafing-like properties by their alignment in applied magnetic field. Particles used for this application have to be magnetic and preferably reflective. Particles being dispersed in liquid ink, coated on a surface of a substrate and exposed to an external magnetic field, tend to align with their easy axis along lines of the field. The particles' positions become fixed after their orientation by curing of the binder. In materials science, the term "easy axis" is referred to the energetically favorable direction of the spontaneous magnetization in a ferromagnetic material. This axis is determined by various factors, including the magnetocrystalline anisotropy and the shape anisotropy. The two opposite directions along the easy axis are usually equivalent, and the actual direction of the magnetization can be either of them.

Alignment of magnetic particles, dispersed in a layer of an organic binder on a surface of a substrate and exposed to an external magnetic field, is described in many books and patents, for example, Magnetic Recording by C. Denis Mee; McGraw-Hill Book Company, ISBN 0-07-041271-5, Volume 1, p. 164, or The Complete Handbook of Magnetic Recording, by Finn Jorgensen; TAB Professional and Reference Books, ISBN 0-8306-1979-8, 1988.

C. D. Mee describes the alignment of particles in a recording media by applying a magnetic field parallel to the web transport direction. The preferred configuration of the magnetic pole pieces of a permanent magnet circuit was one of opposite poles on both sides of the web, which have no perpendicular field component in the center plane. The author also described various magnetic devices for orientation of magnetic particles along the web direction. However, there is a particular common feature in alignment of particles by these devices relative to the surface of the substrate. The references clearly state that for recording tapes the particles are aligned with their easy axis along direction of the web.

Most of magnetic materials used in recording media are quasi one-dimensional having one dimension much larger than two others, such as a shape similar to wires or needles. As is shown in FIG. 1a, a particle shaped as a platelet 101 can be considered as a two-dimensional (XY) physical body due to the large aspect ratio of its dimensions: X and Y which are substantially larger than Z. When a platelet is induced by a magnetic field, it experiences a magnetic torque whenever its dipole vector is not parallel with the external field. The existence of the magnetic torque results in the rotation of the particle with its easy axis along direction of magnetic lines 102 of an external field; and the dipole vector of the platelet becomes parallel to the magnetic field vector. The particle does not rotate and becomes stabilized in this position until the field is removed. In other words, the particle becomes oriented with its longest diagonal, which can be considered as a major dimension, for example the coordinate X, parallel with lines of applied magnetic field, as is shown FIG. 1a.

However, the second dimension, Y, may not be always parallel to the substrate. In fact we have noted that it is always tilted at some small angle to direction of applied magnetic field. This small tilt is not very important for the overall performance of recording media, however, it becomes very significant in the paint and printing industries for the production of durable highly reflective coatings on various substrates.

For many decades, attempts have been made to fabricate bright coatings with reflective flake material. Pratt et al., in 1947 publicly disclosed in U.S. Pat. No. 2,418,479 a process of orienting metallic flake pigments for making bright coatings. Pigments, such as ferromagnetic flakes, in paint films are positioned on a simple, planar surface by reaction to a magnetic field. Both the article surface and the flakes are located in the direction of the magnetic field. This method requires that the article surface on which the film is disposed lie between magnetic poles so that each long or major dimension of the particles will align itself along the magnetic field direction, as does a needle of a compass. Pratt et al., disclose a method which includes placing of a wet film containing ferromagnetic flakes to the action of a magnetic field and to directional angle between the film and the field being made to vary from parallel to the perpendicular at short intervals of time until the film has dried. Directional changes between the film and the field can be produced either by rotation of the film or by planar rotation of magnetic field. Electromagnetic system described in the patent generates a rotating magnetic field allowing the flake to change its direction with the frequency from 5 to 10 Hz. The magnetic field changes its direction by 90°. The magnets in one of the sets were hollow and the substrate was passing continuously at a predetermined rate through the center on these hollow magnets.

Although Pratt's invention disclosed in U.S. Pat. No. 2,418,479 has made an advance in the art it has some disadvantages. The use of Pratt's method is impractical for large surfaces of articles since the magnetic field strength would have to be extremely large and difficult and costly to construct. In addition, such method as described would not operate to orient a majority of the flakes disposed in a film or coating on a curved or complex shaped, non-planar article surface. One example of such a surface is an annular or airfoil shaped component of power generating apparatus such as a gas turbine engine.

James Peng in U.S. Pat. No. 4,859,495, assigned to Eastman Kodak, and issued 1989 discloses a method of making a magnetic recording film having the magnetic particles oriented in any given direction which comprises applying a magnetic paint to a substrate, subjecting the substrate containing the magnetic paint in an unfixed condition to a rotating magnetic field having magnetic components that lie only in a plane perpendicular to the given direction and fixing the magnetic paint. Orientation of the flakes occurs in layer of organic binder containing dispersed magnetic flakes coated on a surface of moving web. One magnetic system describes four Helmholtz coils. The second embodiment describes a system for a rotating magnetic field having no Z component while the magnetic paint layer is moving at a rapid rate on the substrate in a fluid condition. This embodiment is suitable for making magnetic media in very wide widths for example up to thirty and even fifty inches in width because it is not limited in the same manner as that of the Helmholtz coils. The embodiment utilizes two conductive plates such as, for example, copper plates which are disposed above and below the moving web. The current in the plate on the top of the moving web traverses across the width of the moving web. The plate beneath the moving web has a current which traverses the plate in the direction of motion of the moving web due to the voltage source. The two currents impressed by two voltage sources 90° out of phase with respect to each other and this causes a rotating magnetic field having components only in the X and Y direction with no magnetic component out of the plane of the web or in the Z direction. Disadvantages of this method are also lack of its usefulness for large surface substrates, problems with uniformity of orientation over the large surface, destruction of a proper orientation by the exit magnetic field and lack of practicability of in-field UV curing.

United States patent application US 2004/0052976 in the names of Buczek et al. discloses alignment of non-spherical particles with their major dimension oriented generally along an article surface in respect to which the particle is disposed. The particles, disposed in a fluid medium, the viscosity of which can be increased to secure the particles' in position, are positioned using a force on the particles. The force includes a torque force from a magnetic field, force from flow of the fluid medium, the force of gravity, and the force of surface tension alone or in combination with the force of gravity. For control of brightness of or reflection from a surface, coatings and sheets have used non-spherical metallic particles in the shape of flakes having a major dimension, with the relative orientation of the flake and the major dimensions in respect to the article surface determining the degree of brightness or reflection. Although this method has some usefulness for making of bright paint coatings it lacks practicality for printing bright images on the top of a wide web moving for example at speeds of 100-500 ft/min.

Another United States Patent which relates to magnetic alignment of particles is U.S. Pat. No. 5,630,877 in the names of Kashiwagi et al. who disclose alignment of magnetic particles or flakes dispersed in organic binder and exposed to an external magnetic field. A method and an apparatus are taught for producing a product having a magnetically formed pattern, capable of forming a desired pattern in diversely different shapes with a clear visual recognizability, at high speeds using a simple procedure, and a painted product produced by these methods and apparatus. However, the patent does not describe how to make bright coatings with X and Y components parallel to the surface of a wide web moving high a speeds.

OBJECTS AND SUMMARY OF THE INVENTION

It is an object of the present invention, to provide a system and method for printing at high speeds upon a wide substrate, a highly-reflective abrasion-resistant article with ink containing magnetic platelets which are exposed to magnetic fields that orient the platelets such that their two main dimensions become parallel to the surface of the substrate providing a "leafing-like" brightness and a method of orientation of particles.

Another object of this invention is formation of sheets of magnetic platelets in the layer of ink.

Another object of this invention is an increase of chroma in images printed with ink containing magnetic color-shifting pigments.

Another object of invention is to print coatings with a "foil-like" reflectance and brightness or color travel.

It is another object of invention to provide a security document containing security insignia printed with ink containing magnetic color-shifting platelets oriented in applied magnetic field until two main dimensions of the platelets become essentially parallel to the surface of the ink so that the chroma and dynamic color area of the coating is increased.

Another object of invention is printing of coating containing magnetic platelets assembled in two-dimensional continuous sheets.

A principal object of this invention is to provide a method and device for printing articles and the articles themselves printed on a flat substrate with ink containing metallic or color-shifting magnetic platelets aligned in applied dynamic magnetic field in a way that all platelets are co-planar to each other and to the surface of the ink.

This invention provides security articles printed with inks containing reflective or color-shifting pigments on a surface of a wide and fast moving web or paper having dimensions for example of up to 60" at speeds of 50-300 fpm.

This invention provides a method and system for high speed printing an alignment of highly reflective magnetic pigment flakes which after alignment while the web is moving at high speeds yields a mirror-like finish. Such prints can be fabricated with utilization of magnetic reflective or color-shifting pigments dispersed in an ink vehicle.

In accordance with this invention there is provided, a method of planarizing a plurality of orientable non-spherical flakes supported by a longitudinal web comprising:

providing a web supporting a coating of field orientable non-spherical flakes;

providing first and third magnets on one side of a line defining a feedpath and providing a second magnet between the first and third magnets on the other side of the line, wherein the first and third magnets have a same polarity facing the line and wherein the second magnet has an complementary polar polarity to the first and third magnets facing the line, so that a first magnetic field spanning the line is present between the first and second magnets and second magnetic field spanning the line is present between the second and third magnets, wherein the magnets are positioned so that a plurality of non-spherical field orientable flakes moving along the feedpath experience a first rotation as they pass the second magnet when the web is moving; and, relatively moving at least one of the web supporting the flakes and the magnets along the feedpath so that the flakes sequentially pass through the first and second fields.

The inventors of this invention have discovered a method for alignment of neutrally buoyant multi-layered optical platelets dispersed in organic binder and coated onto a flat fast moving web and exposed later to an external magnetic field until the platelets form a sheet-like assembly that exhibits (after solidifying of the suspension) optical reflectance of at least 50% of the same optical structure deposited on glass or another suitable smooth substrate. Magnetic inks are have been used since 1956 in a character recognition technology known as Magnetic Ink Character Recognition (MICR) as well as a magnetic recording media. Each of magnetic inks is a magnetorheological (MR) fluid with more or less pronounced flow control by applied magnetic filed. Rheological properties of magnetic inks depend on physical and chemical properties of a binder and magnetic particles dispersed there. Rheology of suspended particles is well described by S. W. Charles; Further description of Rheological properties of magnetic inks can be found in Rheology of particulate dispersions and composites. CRC Press, ISBN 1-57444-520-0, 2007 and in the Journal of Magnetism and Magnetic Materials, 65 (1987), 350-358.

The flow characteristics of magnetorheological fluids strongly depend on the size, shape and susceptibility of magnetic particles.

There are two known and well-studied magnetic fluids. A suspension with dispersed nano-scaled colloidal magnetic particles is called ferrofluid if it becomes strongly polarized in the presence of a magnetic field. A suspension with micrometer-sized magnetic particles is called Magnetorheological (MR) if it substantially increases its viscosity when exposed to external magnetic field. However, there is another sort of magnetorheological fluid that contains micron-sized magnetic platelets which have dimensions with a high aspect ratio. These fluids, coated on a surface of articles, are used as magnetic paints and inks responding to the force of an applied field by re-orientation of magnetic platelets in the field. Viscosity of the ink depends on the field intensity, field direction, particles concentration, binder viscosity, magnetic susceptibility of magnetic platelets, etc. An example of viscosity change with increase of a magnetic field is demonstrated in FIG. 1b.

Magnetic pigment consisting of flat magnetic platelets with an average size of 20×20×0.5 microns was mixed with a rotary screen ink vehicle in the concentration of 20 wt %. Viscosity was measured with a Brookfield viscometer model DV-II at 50 rpm. The viscosity was measured with no field introduced and also with few different fields generated by two permanent magnets differently spaced from each other to create fields of different intensity. It was possible to measure that in the absence of the field the viscosity was 1742 cP; and the viscosity rises as the field intensity grows and comes to 3544 cP at the field magnitude of 0.74 T (740 Gauss).

It is known that a single magnetic particle dispersed in a liquid binder and induced by a magnetic field obtains a magnetic dipole moment and orients with its easy axis along magnetic lines of the field canceling the net field strength as much as possible and lowering the energy stored in that field to minimum. Large numbers of particles suspended in a diluted binder, similarly all identically orient themselves along direction of the field. In a suspension with a large concentration of the platelets exposed to the static field they undergo various interactions. Detailed description of the chain formation mechanism is given by J. H. E Promislow, A. P. Gast; Aggregation kinetics of paramagnetic colloidal particles, *J. Chem. Phys.*, 1995, 102, 5492-5498; and by E. Clement, M. R. Maxey, G. E. Karniadakis; Dynamics of self-assembled chaining in magnetorheological fluids; *Langmuir*, 2004, 20, 507-513.

Particles dispersed in the binder and exposed to a field simultaneously experience Brownian motion, dipolar magnetic attraction, and multibody hydrodynamic interaction. Particles join together forming supraparticle structures such as chains when the dipole strength (characterizing the ratio of magnetic attraction to random diffusion) exceeds a critical value. In chains the North pole of one particle is attracted to the South pole of another particle and to another particle and so on. The chains are protruded in the direction of an applied magnetic field as shown in FIG. 2.

FIG. 2 consists of 16 diamond shaped particles 201 with North (black) and South (white) poles shown in the picture with different colors for illustrative purposes. The direction of an external magnetic field is indicated by the arrow 202. The particles have formed four chains I-IV (shown by the dashed lines) in the direction of the field 202. Each chain consists of head-to-tail array of four platelets: 1-4, 5-8, 9-12 and 13-16. As time passes, particle/chain and chain/chain interactions lead to continuous increase of a cluster size and increase of the entire system viscosity.

However, if the magnetic field direction shown in FIG. 2 changes suddenly for example, by rotating it by 45° counterclockwise, the platelets will start to rotate instantaneously around their centers until new attraction forces of applied magnetic field will form new chains as shown in FIG. 3a. It is important to note that the platelets 1-16 in FIGS. 2 and 3 physically maintain their position on the substrate however their polar orientation rotates 45° counterclockwise. As a result of the polar re-orientation of the platelets, a few new chains from the same particles 1-16 previously shown in FIG. 2 have been formed along the new direction of the field. Now platelets 5, 10 and 15; 1,6,11 and 16; 2, 7 and 12; 3 and 8; 9 and 14 have formed chains shown by the dashed lines in FIG. 3. Another change of direction of the field causes formation of other chains from the same particles.

In the most extreme case the field may change its direction continuously. This happens when the field rotates as disclosed by Pratt in U.S. Pat. No. 2,418,479. Pratt mentioned brightening of a paint coating when a substrate with a layer of wet paint was inserted between poles of two permanent magnets and spun. Magnetic particles dispersed in a binder and exposed to a rotating magnetic field, simultaneously experience a magnetic torque that drives their individual spinning motion toward the direction of magnetic field lines, centripetal attraction, that is a magnetic attraction toward the center of domain and flow-induced interactions. The hydrodynamic repulsion balances the centripetal attraction of magnetized platelets and leads to the formation of an aggregate of several particles that rotates with a velocity related to the inter-particle distance. A single platelet, when it is dispersed in a liquid media, rotates easier around its Z axis because the resistance to the liquid at the edges is substantially smaller than if the platelet rotated around its X or Y axis. It is driven by the aspect ratio of the platelet dimensions. A few metallic particles rotating in the same plane form an aggregate that is highly reflective.

It is the inventor's view that methods and processes disclosed heretofore by others are not suitable for printing and alignment using a wide substrate moving at high speed, whereas it is desirous to have a high throughput on a wide substrate. The aforementioned patents to Pratt et al. and Peng et al describe processes where a magnet or magnets are located on both sides or underneath of a web. However there are limits to the width of the web since the magnitude of a flux density of the applied magnetic field drops rapidly with the increase of a distance between the poles of the magnets. The spinning magnet disclosed in the Pratt patent cannot practically be made large enough to be utilized underneath a wide web. Furthermore, the dwell time for rotating particles to become oriented in a rotating field would vary in different parts of the wide web and uniformity of the coating would not be achieved. Another negative aspect of Pratt's teaching is that the particles dispersed in the layer of a wet ink on a surface of the web, that move on the top of a fast spinning magnet, will simultaneously rotate and move in the direction of the web along a corkscrew trajectory.

Another issue that should be considered when magnetically aligning flakes on a moving web is the exit field. The magnetic field of any magnet is not uniform. When the web moves along the magnet the particles dispersed in wet ink and coated on the surface of the web respond to the field immediately and, therefore, undergo through their different orientations in respect to the substrate. The orientation of particles in the exit field is very different than orientation of the particles in the part of the field where they receive a particular predetermined orientation. As a result of the exit field, aligned printed images become "washed out" as contours become blur and lose sharpness.

To align magnetic platelets dispersed in a layer of wet ink where two major axis were parallel to the surface of the substrate, we applied a dynamic magnetic field generated by a magnetic setup located underneath the substrate. This position of the magnetic device causing required orientation of the platelets allows using it for a substrate of indefinite width. The device generates a magnetic field with a directional angle of less than 90°. The web can move with a high speed over or through such magnetic systems. Instead of rotation disclosed in the prior art, the field rapidly changes its direction forcing the particles to oscillate rapidly until both major axis of platelets became parallel to the substrate. Ultra-violet curing of the ink containing platelets oriented in the field eliminated a negative effect of the exit field.

A basic principle of operation of dynamic magnetic systems disclosed U.S. Pat. No. 7,258,900 in the name of Raksha et al. This patent discloses cross-web alignment of magnetic platelets dispersed in an ink vehicle and coated by printing onto a fast moving substrate. The particles are aligned between two rows of static down-web positioned magnets as illustrated schematically in FIG. 3C which is illustrative of the method employed. The flat substrate 22 moves toward the reader. The images 68 and 70 are printed on the top the substrate 22 with ink containing magnetic platelets 16. The ink was still wet when the images 68 and 70 were introduced into the field of the magnets 62, 64, and 66. The magnets generate magnetic field with lines 72 which are almost flat and parallel to the substrate in the places where printed images are located on the substrate. The alignment of platelets 16 in the wet images 68 and 70 along magnetic lines 72 is almost parallel to the substrate.

The top view of the particles' alignment is demonstrated in Prior art FIG. 4. The web 401 moves in the direction 402. The layer of wet ink 403 contains magnetic particles 404 and 405. The magnets 406 and 407 are located underneath the web as illustrated in FIG. 3C. The particles 404 printed on the web 402 do not have any predetermined orientation. Once the particles move with the web into the area between the magnets 406 and 407 they orient themselves across the web in the direction of magnetic field 408 with their planes nearly parallel to the web.

It is an object of this invention to provide better alignment of platelets in a high speed process where the width of the web is not a limiting factor.

BRIEF DESCRIPTION OF THE DRAWINGS

Exemplary embodiments of the invention will now be described in conjunction with the drawings, in which.

DETAILED DESCRIPTION

AC or DC electromagnets or permanent magnets, can be used in accordance with this invention to provide a dynamic magnetic fields. A top view of an exemplary embodiment of this invention is shown in FIG. 5.

Figure 1A:
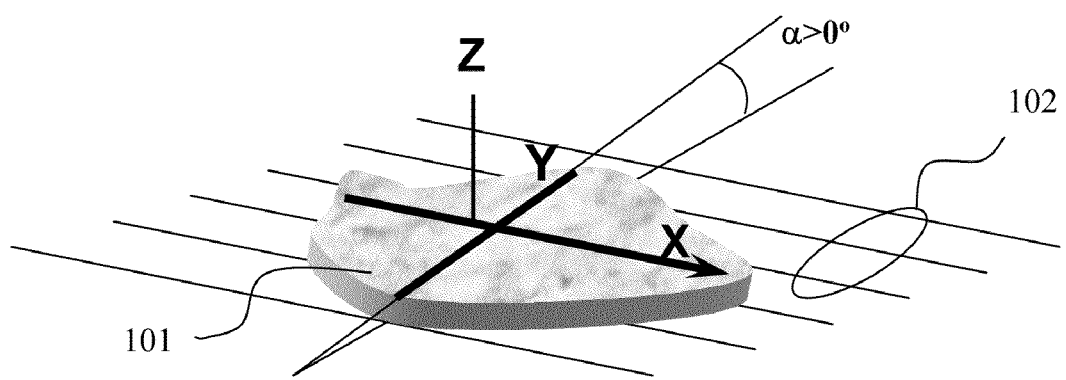
FIG. 1a is a drawing of a magnetically orientable platelet or particle exposed to a magnetic field wherein alignment of the particle with respect to the magnetic field is along the X-axis of the particle.
Figure 1B:
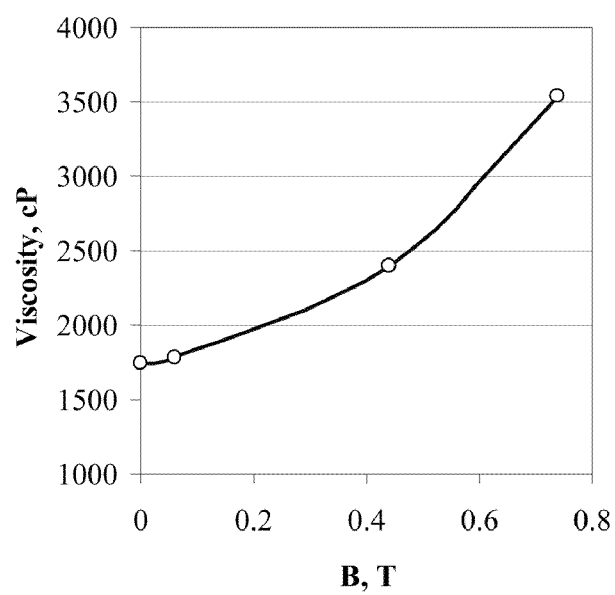
FIG. 1b is a graph of viscosity change with magnetic field.
Figure 2:
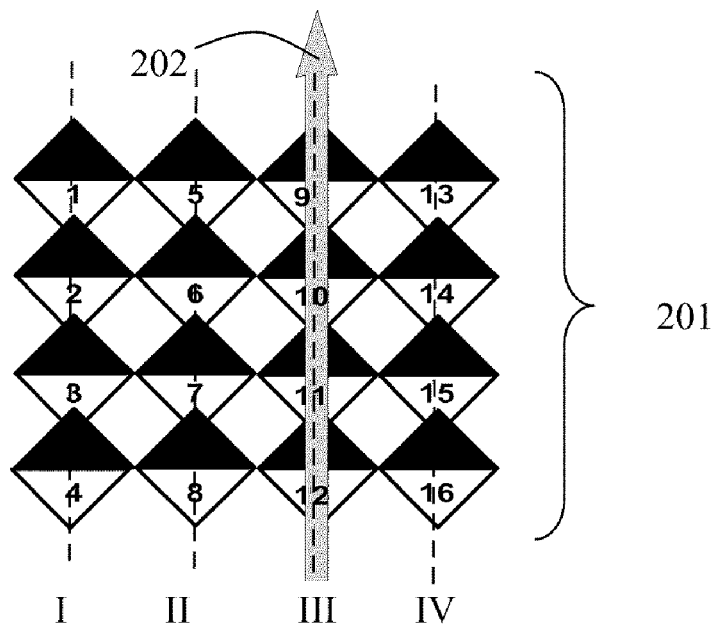
FIG. 2 is a drawing of 16 diamond shaped particles or flakes with North (black) and South (white) poles shown in the picture with different colors for illustrative purposes.
Figure 3A:
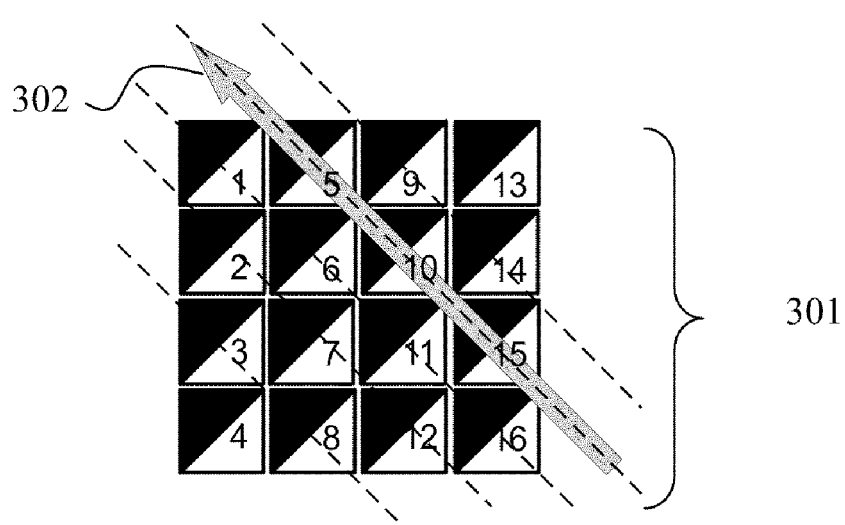
FIG. 3a is drawing similar to FIG. 2, wherein the flakes or particles are rotated along magnetic field lines forming a sheet of particles.
Figure 3B:
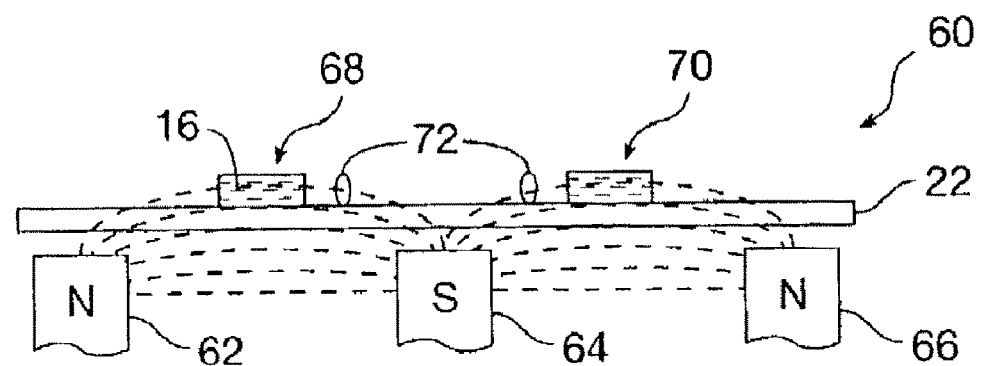
FIG. 3b is illustrative of a prior art system wherein that attempts to planarize and align flakes disposed between two magnets.
Figure 4:
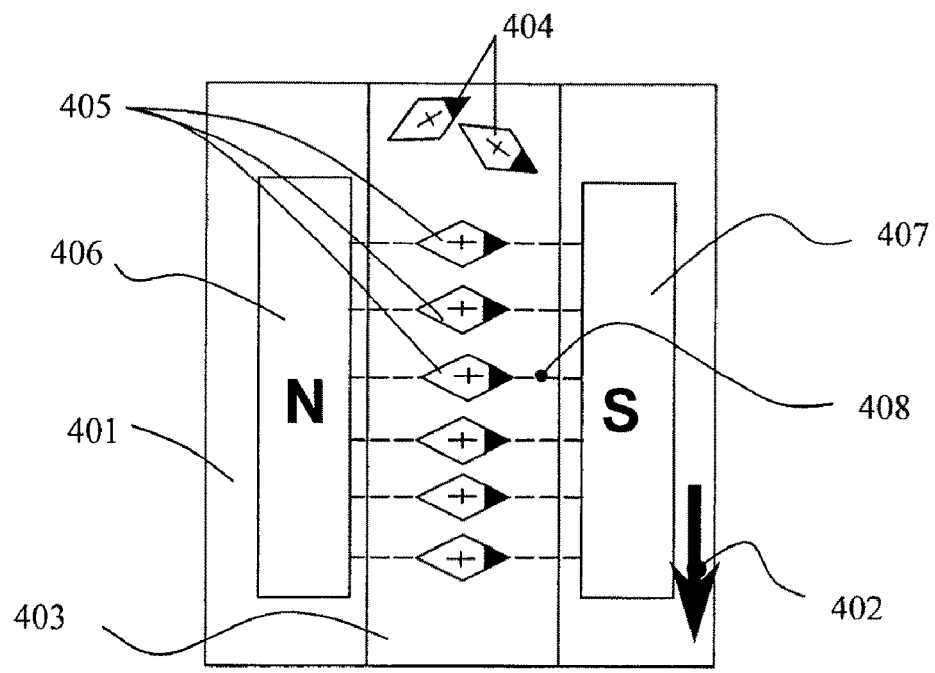
FIG. 4 is an illustration of a prior art system wherein flakes passing between two bar magnets are aligned along field lines between the two magnets.
Figure 5:
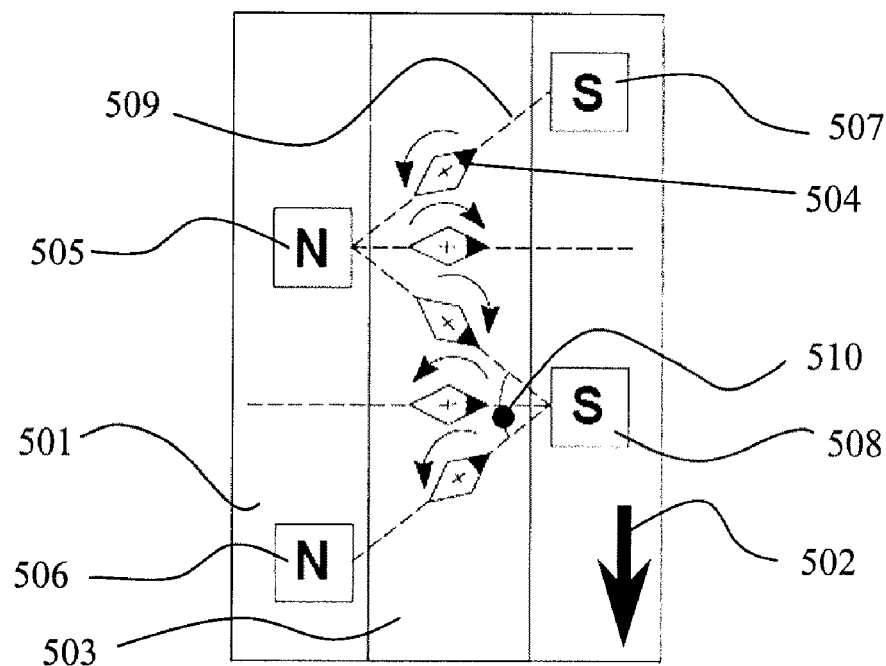
FIG. 5 is a diagram of an embodiment of the invention wherein staggered magnets of complementary polarities for example North South, or South North are positioned so as to be staggered along the feedpath for rotating flakes supported by a web along the feedpath as the flakes or magnets are relatively moved.

Referring now to FIG. 5, the web 501 moves in the direction of arrow 502. The ink 503 containing magnetic particles is coated on the surface of the web 501. The magnetic particles in FIG. 5 are representation of the single particle 504 at different stages of alignment in the ink vehicle as it moves past the magnets 506-508. When the web moves the particles become influenced by the magnetic field created by the magnets. The magnets are disposed in zigzag formation with angles 510 smaller than 90°. When the ink 503 is printed on the web 501 it moves into the area between the magnets. The particles orient themselves in the directions 509 of the field shown in FIG. 5 by the dashed lines. Direction 509 of the field changes as the web moves in the direction 502. The particle 504 undergoes rotations depicted by arrows in the picture in the plane of the web at the angles 510 determined by the magnets zigzag arrangement. We found that the angle 510 works well when it is in the range 45°-90°. A plurality of magnetic particles, passing through the alignment area between the magnets, also undergoes various head-to-tail interactions illustrated in FIG. 3. The particles, rotating in the field experience forces in different directions. The forces present are macroscopic force determined by the applied field and microscopic forces determined by the fields of nearby dipoles. The force on a single particle is a sum of forces due to each field contribution. The particles will move in the plane of the web until they will increase the ink layer susceptibility along XY directions thus maximizing the susceptibility sum. To the end of the transition path between the magnets the platelets form a permanently linked sheet-like structure where magnetic platelets are oriented with their XY axis parallel to the web.

FIG. 5 illustrates a linear arrangement of permanent magnets that provides a predetermined change of the field direction as flakes move by the magnets. A few lines can be combined together and mounted on a printing press underneath a wide web as it is illustrated schematically in FIG. 6 where the web 601, schematically shown to be transparent for illustrative purposes, is coated with square labels 602 printed with the ink containing magnetic particles in the previous printing process not shown in the picture. Cube-shaped magnets 603, assembled as illustrated in FIG. 5, are located in close proximity to the web 601 and directly underneath of it on a bench of a printing press, not shown in the picture. The width of the web can vary in the range of 6" to 72". The speed of the web can be varied in the range of 10 to 300 ft/min. The number of magnets in a single string along the web can be varied, for example from 4 to 40 or more. Going through a field of permanent magnets in the direction 604 of the web, the platelets rotate in the plane of the web until they came to the stable sheet-like formation with their X and Y axis parallel to the web.

Figure 6:
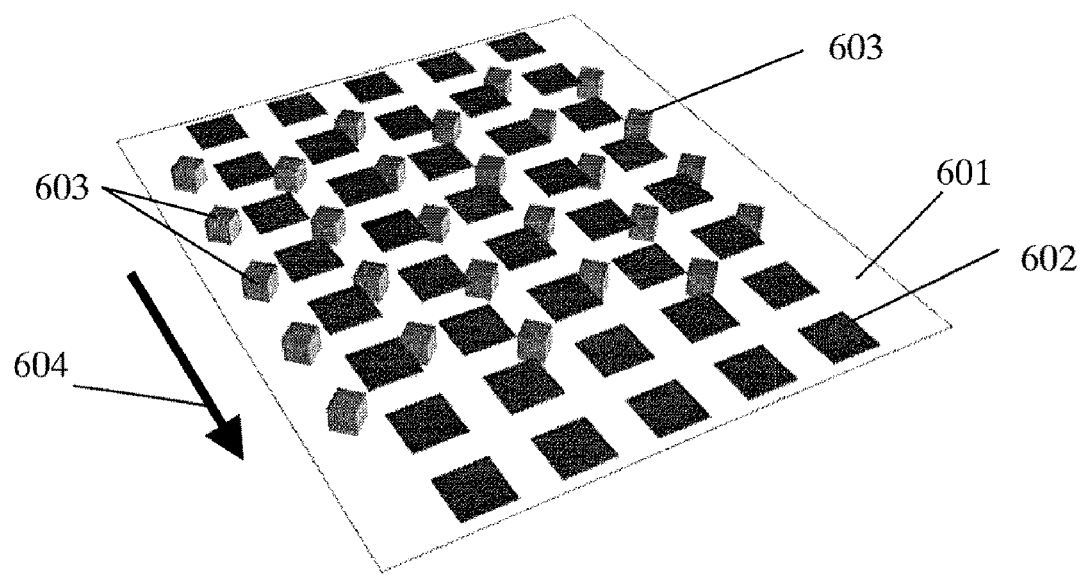
FIG. 6 illustrates a more complex arrangement of magnets disposed alone multiple parallel feedpaths effecting the spinning of flakes within a coating, before the coating cures.

As we found, different magnetic assemblies can be employed to rotate magnetic platelets in the plane of a flat substrate when it moves. They can be AC electromagnets with controlled direction of magnetic field generated with them as the web moves. They also can be assemblies of permanent magnets with opposing polarity. The magnets can be either underneath the web as illustrated in FIG. 6 or above and underneath (if the assembly consists of two parts). The main characteristic feature of all of these assemblies is their field that rotates magnetic particles in the plane of a fast moving web. Alternatively, a color-shifting magnetic pigment can be used for printing of security articles with high chroma on bank notes, valuable documents, IDs, etc., as demonstrated in the laboratory sample below.

The change from alignment in the static to dynamic magnetic field has drastically increased reflectance of light and chromatic properties of the prints. We found that we can make a print from ink containing flat reflective platelets with the printed layer reflectance that is at least 50% of the reflectance of a mirror.

It is important to cure the sheet-like assembly of platelets in the dynamic field as disclosed in earlier Flex patents/applications. The exit field of the dynamic magnetic system has a direction different than the direction where platelets orient themselves parallel to the substrate.

Exemplary Embodiment

Figure 7:
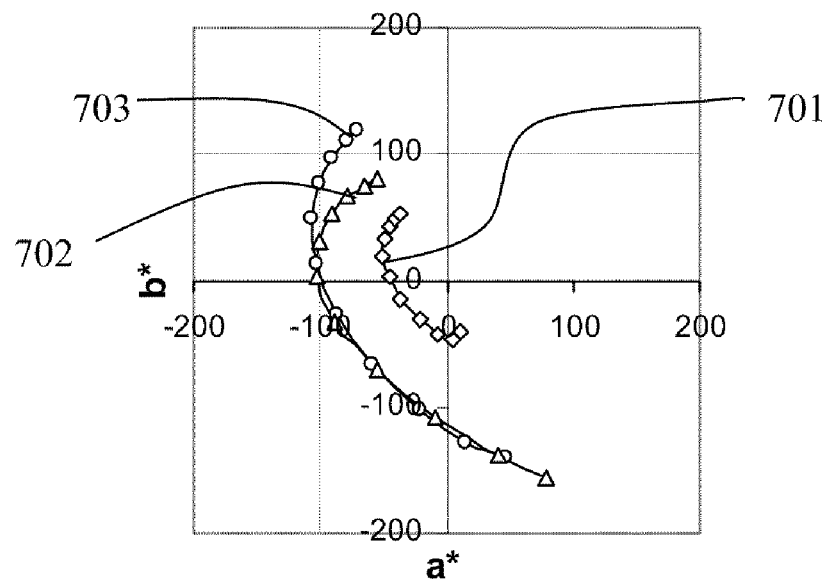
FIG. 7 is a color travel plot illustrating a difference in two coatings wherein one was subjected to rotation using the method of this invention, and wherein the other coating was not.
Figure 8:
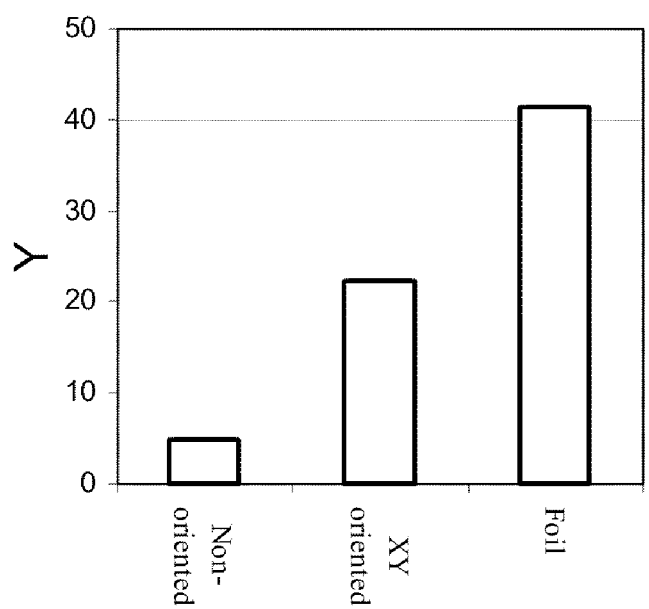
FIG. 8 is a plot illustrating luminance of a non-oriented coating, versus an oriented coating in accordance with an embodiment of this invention, versus a foil.

Magnetic color-shifting pigment was fabricated by vacuum deposition of a thin-film gold-to-green interference stack in vacuum on the top of a polyester substrate. One part of the substrate was cut off and left for further color measurements. The rest of the deposit was released off the substrate, ground and sized to the 20 micron pigment powder as disclosed in earlier Flex patents. The pigment platelets were dispersed in the UV-curable clear Sericol Rotary Screen Ink Vehicle in concentration of 20 wt % and coated on the surface of a paper with the screen printing techniques. One half of the wet print with non-oriented platelets was cut off and the ink was cured with UV-light. Second half of the print was attached to the web running through a magnetic array in order to orient the platelets with their X and Y axis parallel to the web. The print was cured with UV light after completion of the alignment. The color travel of all three samples with off-gloss 10° was analyzed with the Zeiss spectrogoniometer. The a*b*color travel plot is illustrated in FIG. 7. The line 701 corresponds to the print containing non-oriented platelets. The color travel line 702 corresponds to the sheet-like alignment of magnetic gold-to green platelets oriented in the dynamic field. The curve 703 corresponds to the polyester substrate coated in vacuum with the gold-to-green interference stack. Reflected specular luminance of the same samples was measured with the SF600+ spectrophotometer. The plots of reflected luminance Y are demonstrated in FIG. 8.

This invention provides a highly-reflective abrasion-resistant article printed on a wide substrate moving at a high speed with ink containing magnetic platelets and exposed further to dynamic magnetic field of such configuration that the platelets get oriented in the ink with their two main X and Y axis parallel to the surface of the substrate providing a "leafing-like" brightness. This highly-reflective abrasion resistant article can be a part of a security document containing security insignia printed in accordance with the method of this invention wherein X and Y axis of the platelets or flakes are parallel to the surface of the ink that increases chroma and dynamic color area of the coating.

Furthermore, this invention allows and provides for the formation of a highly reflective layer of magnetic platelets in the layer of ink by the exposure of the multiplicity of platelets to dynamic magnetic field that forces platelets to rotate at angles smaller than 90° in the plane of the substrate until they form stable sheet-like structures.

Figure 9:
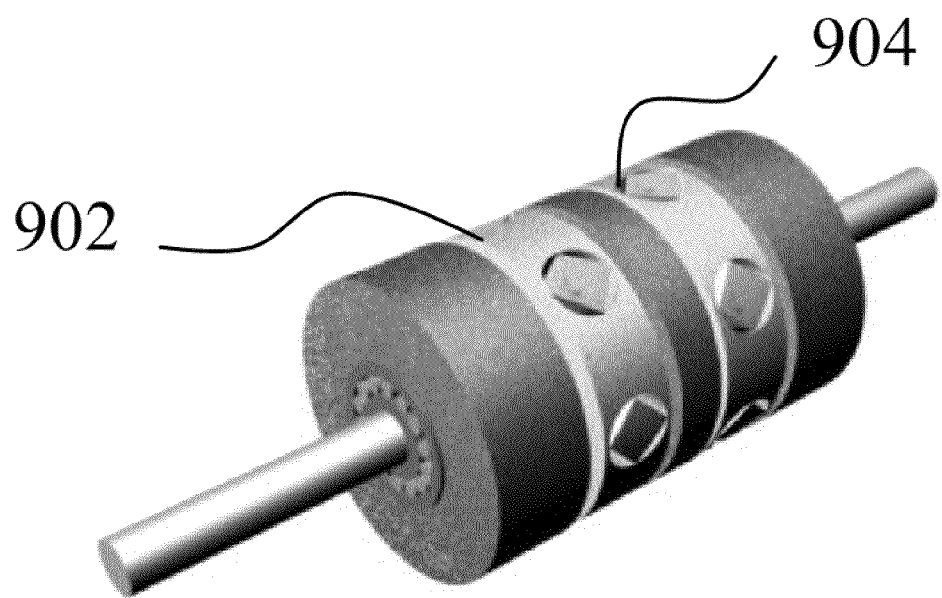
FIG. 9 depicts an embodiment of this invention wherein a set of rollers upon an axis are used to rotate the flakes in accordance with the method of this invention.

Another embodiment of this invention is shown in FIG. 9, where an arrangement of rollers provides essentially the same effect as the linear arrangement of magnets along-side a feedpath shown in FIG. 5. However the rollers in FIG. 9 yield a more compact embodiment of this invention. The feedpath remains, the path along which the web is transported over the rollers, and the magnets in this embodiment are similarly and effectively spaced along the feedpath. Referring now to FIG. 9, two wheels 902 and 904 supported and rotatable with a shaft having magnets thereon are spaced a distance "d" apart. The wheels 902 and 904 are affixed to the shaft with set screws so that when the shaft was rotated the magnetic wheels rotated with the shaft. The magnets have the same staggered configuration as those in FIG. 5. A web, supported by an arrangement of support rollers adjacent to the two wheels 902 and 904 have a slightly higher profile than the two wheels and carry the web along the feedpath without the web making contact with the magnets. The web support rollers are mounted on the shaft with non-magnetic bearings. In a preferred embodiment the web can be moved in a direction of feedpath while the magnetic wheels 902 and 904 can be rotated in an opposite direction counterclockwise to increase the amount of flake rotations per minute.

What is claimed is:

1. A method of planarizing a plurality of orientable non-spherical flakes supported by a longitudinal web comprising:
    a) providing a web supporting a coating of field orientable non-spherical flakes;
    b) providing first and third magnets on a first side of a feedpath and providing a second magnet between the first and third magnets on a second opposite side of the feedpath, wherein the first and third magnets have a same polarity and wherein the second magnet has a complementary polarity to the first and third magnets, so that a first magnetic field spanning the feedpath is present between the first and second magnets and second magnetic field spanning the feedpath is present between the second and third magnets, wherein the magnets are positioned so that a plurality of non-spherical field orientable flakes moving along the feedpath experience a first rotation as they pass the second magnet during relative movement between the web and the magnets; and,
    c) relatively moving at least one of the web supporting the flakes and the magnets forming two pairs of complementary attracting magnets.

2. A method as defined in claim 1, wherein the step (c) comprises moving the web along the feedpath, and wherein the feedpath is defined by a line.

3. A method as defined in claim 2, wherein the first magnetic field and the second magnetic field have first and second field lines respectively that are substantially parallel with the web and wherein the first field lines cross the web at a first angle with respect to the feedpath and wherein the second field lines cross the web at a second angle with respect to the feedpath and wherein the first and second field lines are not parallel and are not orthogonal with the feedpath.

4. A method as defined in claim 2, wherein a first magnetic field is present between the first and second magnet and wherein a second magnetic field is present between the second and third magnet and wherein the first and second magnetic fields traverse the feedpath and a web transport direction.

5. A method as defined in claim 2, wherein the flakes are between 2 and 100 microns in size.

6. A method according to claim 5, wherein the size of the flakes do not vary by more than 20%.

7. A method according to claim 6, wherein the flakes are of a predetermined size and shape.

8. A method according to claim 2, wherein the first, second and third magnets are permanent magnets.

9. A method as defined in claim 1, wherein step (c) comprises moving the magnets along the feedpath.

10. A method as defined in claim 1, wherein step (c) comprises moving the flakes and the magnets along the feedpath.

11. A method as defined in claim 1, wherein the step of providing first second and third magnets also includes providing at least a fourth magnet positioned on a same side of the feedpath as the second magnet and wherein a third field between the third and fourth magnets crosses the feedpath, and wherein the polarity of the fourth magnet is the same as the polarity of the second magnet and complementary to the polarity of the third magnet so as to generate field lines across the feedpath, wherein the magnets are positioned so that a plurality of non-spherical field orientable flakes moving along the feedpath experience another rotation as they pass the third magnet when the web or the magnets are moving.

12. A method as defined in claim 1, wherein the first and third magnets are embedded or supported by a first rotatable wheel, and wherein the second magnet is embedded or supported by a second rotatable wheel, and wherein the feedpath is coincident with a region between the first and second wheels.

13. A method of planarizing a plurality of orientable non-spherical flakes supported by a longitudinal web comprising:
    a) providing a web supporting a coating of field orientable non-spherical flakes along a feedpath;
    b) providing a first plurality of magnets on one side of the feedpath and providing a second plurality of magnets on an opposite side of the feedpath, wherein the first plurality and second plurality of magnets are staggered, so that they are not directly across from one another along the feedpath, wherein the first plurality of magnets and the second plurality are disposed beside the feedpath at different locations and a form a plurality pairs of magnets having opposite polarities facing the feedpath such that each pair has a complementary polarity providing a magnetic field which traverses the feedpath, and wherein the magnets are positioned so that a plurality of non-spherical field orientable flakes moving along the feedpath experience a plural rotations as they pass magnets along the web; and,
    c) relatively moving at least one of the web supporting the flakes and the magnets forming pairs of complementary attracting magnets.

14. A method as defined in claim 13, wherein adjacent pairs of magnets have a magnet common to both pairs.

* * * * *